United States Patent [19]

Ozeki

[11] Patent Number: 4,758,201
[45] Date of Patent: Jul. 19, 1988

[54] FEED BELT DRIVE IN COIN HANDLING MACHINE

[75] Inventor: Masamichi Ozeki, Ashikaga, Japan

[73] Assignee: Laurel Bank Machines Co., Ltd., Tokyo, Japan

[21] Appl. No.: 15,068

[22] Filed: Feb. 17, 1987

[30] Foreign Application Priority Data

Feb. 27, 1986 [JP] Japan .............................. 61-28181[U]

[51] Int. Cl.⁴ ............................................. G07D 9/00
[52] U.S. Cl. ......................................... 453/56; 453/63
[58] Field of Search ................... 453/7, 11, 56, 58, 59, 453/61, 62, 63; 474/144, 273

[56] References Cited

U.S. PATENT DOCUMENTS 3,757,805 9/1973 Puhahn et al. ..................... 453/58 X
4,249,553 2/1981 Seutoku ................................ 453/62
4,441,516 4/1984 Stadler et al. ..................... 453/56 X

FOREIGN PATENT DOCUMENTS 0104923  4/1984 European Pat. Off. .
52-26295  2/1977 Japan .
53-11293  1/1978 Japan .
53-56094  5/1978 Japan .
56-95774  7/1981 Japan .
58-171318 10/1983 Japan .
59-12688  4/1984 Japan .
59-121491 7/1984 Japan .

Primary Examiner—Joseph J. Rolla
Attorney, Agent, or Firm—Fleit, Jacobson, Cohn & Price

[57] ABSTRACT

An apparatus for driving a feed belt in a coin handling machine comprises a cover for covering a transmission transmitting drive power to the feed belt. The cover is rotatably mounted about a pivot shaft on the machine body to be movable between its open position and its closed position. A motor on the machine body is positioned so that its output shaft is in alignment with the pivot shaft. A transmission belt is spanned between a drive shaft on the output shaft of the motor and a drive pulley on the driven shaft of the transmission.

1 Claim, 2 Drawing Sheets

FEED BELT DRIVE IN COIN HANDLING MACHINE

BACKGROUND OF THE INVENTION

The present invention relates to a drive for a coin feeding belt in a coin handling machine which is adapted to effect the coin sorting, counting, packing and other operations.

In such a coin handling machine, coins are placed on a rotary disc. When the rotary disc is rotated to create a centrifugal force, the force causes the coins to be inducted into a coin passageway wherein the coins are engaged by a feed belt to deliver them from the coin passageway. The feed belt is set to have a desired gap relative to the top face of the coin passageway at a sub-sorting ring portion before reaching the coin passageway, the gap corresponding to the thickness of one coin to be handled. The feed belt is movable with the cover of the transmission when it is opened or closed. Thus, any malfunction such as jamming of the coins on the coin passageway can be dealt with.

Generally, the feed belt has been driven by transmitting drive power from a motor to the drive pulley of the feed belt through a transmission belt or gearing within the cover. With the transmission belt system, a belt is tensioned to form a triangle with one side engaged by a drum arranged coaxially with said drive pulley to drive the transmission belt or to transmit the drive power to said drive pulley. With the gearing system, a gear rotatable coaxially with said drive pulley is interposed into the transmission system.

The prior art coin handling machine as aforementioned has many disadvantages. First, the machine is complicated in construction. Second, the machine requires a suitable pressurizing mechanism to prevent the drum and gear from slipping and the power being transmitted unevenly. And, the machine is not durable due to the fact that the tension on the transmission belt is not constant.

SUMMARY OF THE INVENTION

It is a object of the present invention to provide a feed belt drive in a coin handling machine which eliminates the pressurizing mechanism and thereby prevents the drum and gears from slipping and the power being transmitted unevenly.

According to the present invention a belt driving apparatus comprises a drive shaft positioned in coaxial alignment with a pivot shaft in the cover, an idle pulley on the cover, a drive pulley for the feed belt, a driven pulley arranged in coaxial alignment with the drive pulley and a transmission belt spanned in tension between a drive pulley on the drive shaft and the driven pulley through the idle pulley.

BRIEF DESCRIPTION OF THE DRAWINGS

The above and other objects of the invention will be seen by reference to the following description taken in connection with the accompanying drawings, in which.

DESCRIPTION OF THE PREFERRED EMBODIMENTS

Figure 1:
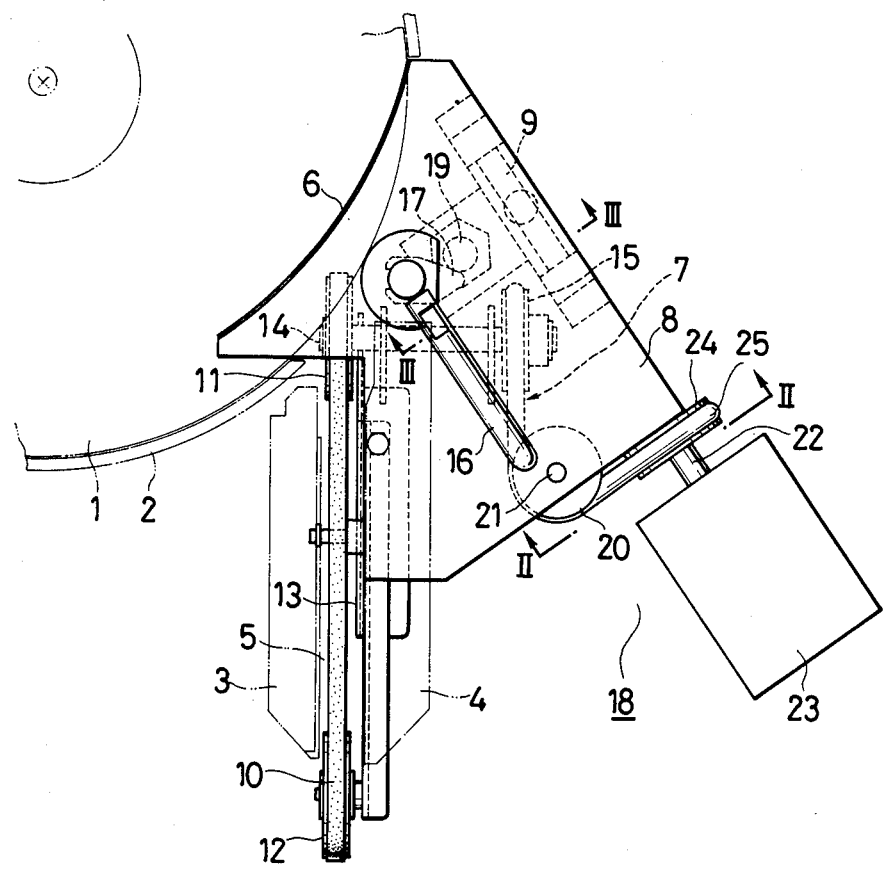
FIG. 1 is a plan view of one embodiment of a coin handling machine according to the present invention.
Figure 2:
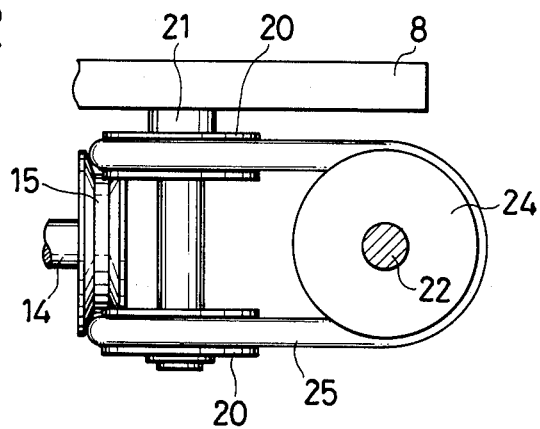
FIG. 2 is a cross-sectional view taken along line II—II of FIG. 2.
Figure 3:
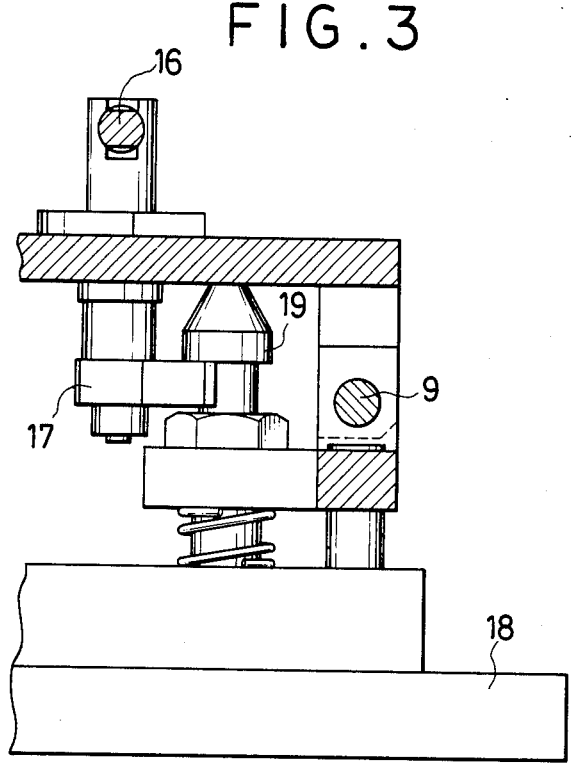
FIG. 3 is a cross-sectional view taken along line III—III of FIG. 2.

The present invention will now be described in detail by way of example with reference to the drawings.

Reference numeral 1 denotes a rotary disc which is adapted to receive coins to be handled and to provide a centrifugal force acting on the coins on the rotary disc when the disc is rotated inside and along a main sorting ring 2.

The main sorting ring 2 is provided with a notch portion which, with guide rails 3 and 4, defines a guide passageway 5. The guide passageway 5 includes various well-known means such as coin sorting holes, counter, stop and the like which for simplicity are not illustrated.

The notch portion of the main sorting ring 2 is formed with a sub-sorting ring 6 which is integral with a cover 8 covering a transmission section 7. The cover 8 is pivotable about a pivot shaft 9 from its opened position to its closed position or vice versa.

The transmission section 7 covered by the cover 8 includes drive pulleys 11 and 12 between which a feed belt 10 is spanned, a coin holding plate 13, a driven shaft 14 and a driven pulley 15. The cover 8 includes an operating lever 16 and a locking pawl 17. The locking pawl 17 is adapted to cooperate with a locking pin 19 which is vertically adjustable in association with a coin type setting dial (not shown). In the interior of the cover 8, two idle pulleys 20 are rotatably mounted on a shaft 21. A motor 23 is mounted on the machine body 18 such that the output shaft 22 of the motor 23 is positioned coaxially with the pivot shaft 9 on the cover 8. The output shaft 22 rigidly supports a drive pulley 24 which is drivingly connected with the driven pulley 15 by a transmission belt 25 through the idle pulleys 20.

In operation, coins placed on the rotating disc 1 are moved below the sub-sorting ring 6 under the action of the centrifugal force. By means of the sub-sorting ring 6, the coins are sorted into desirable coins having a proper thickness and undesirable coins having thicknesses larger than the proper thickness, the latter being eliminated. Thus, only the desirable coins are moved through the coin passageway 5 by means of the feed belt 10. If any jamming is created in the sub-sorting ring 6 or the coin passageway 5, the operating lever 16 is manually rotated to disengage the locking pawl 7 from the locking pin 19. When the cover 8 is opened about the pivot shaft 9, the jammed coins can easily be removed. At this time, the idle and driven pulleys 20 and 15 are rotated about the pivot shaft 9, that is, the output shaft 22. Thus, the idle pulleys 20 will be moved along a circle about the drive pulley 24. Therefore, the transmission belt 25 will not be influenced by the motion of the idle pulleys 20.

In accordance with the present invention, the positional relationship between the drive pulley directly connected to the motor on the machine body, the belt driving pulley on the cover and the driven pulley on the cover will not be influenced by the motion of the opened or closed cover. As a result, the transmission belt will not adversely be affected by the motion of the cover. Consequently, the transmission belt does not require to be pressurized. This results in a reduction in the force required to open and close the cover and increased durability of the belt.

What we claim is:

1. An apparatus for driving a feed belt in a coin handling machine, said apparatus comprising:

a machine frame, a pivot shaft provided above said machine frame, a cover rotatably mounted on said pivot shaft to be movable between an open position and a closed position, a motor mounted on said machine frame, an output shaft of said motor aligned coaxially with said pivot shaft, a drive pulley attached to said output shaft, driven pulleys rotatably mounted on said cover, a transmission belt trained in tension on said drive pulley and said driven pulleys so that said transmission belt avoids being adversely affected by motion of said cover.

* * * * *